(12) United States Patent
Malicki

(10) Patent No.: US 11,299,291 B2
(45) Date of Patent: Apr. 12, 2022

(54) SYSTEM OF DRIVING CHANNELS FOR A CARRIAGE FOR TRANSPORTING AIRPLANES ON AN AIRPORT APRON

(71) Applicant: Slawomir Malicki, Gora Kalwaria (PL)

(72) Inventor: Slawomir Malicki, Gora Kalwaria (PL)

(*) Notice: Subject to any disclaimer, the term of this patent is extended or adjusted under 35 U.S.C. 154(b) by 233 days.

(21) Appl. No.: 16/674,518

(22) Filed: Nov. 5, 2019

(65) Prior Publication Data
US 2020/0079527 A1 Mar. 12, 2020

Related U.S. Application Data

(63) Continuation of application No. 15/351,524, filed on Nov. 15, 2016, now Pat. No. 10,486,829.

(30) Foreign Application Priority Data

Nov. 16, 2015 (PL) .......................................... 414811

(51) Int. Cl.
 *B64F 1/00* (2006.01)
 *B64F 1/26* (2006.01)
 *B64F 1/22* (2006.01)

(52) U.S. Cl.
 CPC ............... *B64F 1/002* (2013.01); *B64F 1/22* (2013.01); *B64F 1/227* (2013.01); *B64F 1/228* (2013.01); *B64F 1/26* (2013.01)

(58) Field of Classification Search
 CPC .... B64F 1/00; B64F 1/002; B64F 1/22; B64F 1/227; B64F 1/228; B61B 5/00; B61B 5/02; B61B 5/025; B64C 39/024; B64C 2201/086; B60M 1/32; B60M 1/34
 See application file for complete search history.

(56) References Cited

U.S. PATENT DOCUMENTS 3,162,404 A * 12/1964 Squire ....................... B64F 1/00
244/114 R

* cited by examiner

*Primary Examiner* — Robert J McCarry, Jr.
(74) *Attorney, Agent, or Firm* — Ralph E. Jocke; Walker & Jocke

(57) ABSTRACT

The exemplary embodiments provide a system of selectively moving airplanes on an airport apron. Airplanes are selectively moved from selective parking locations to areas adjacent to take-off locations such as runways. Airplanes may also be selectively moved from an area of the apron adjacent to a landing location and/or to a parking location. This may include for example an unloading location, an airport terminal, a servicing location, a fueling location, storage location and/or other suitable location. The exemplary system includes driving channels through which a carriage is selectively moved. The carriage includes a basket for operatively engaging at least one front wheel of selected airplanes for purposes of transporting such airplanes to and between the desired locations.

22 Claims, 11 Drawing Sheets

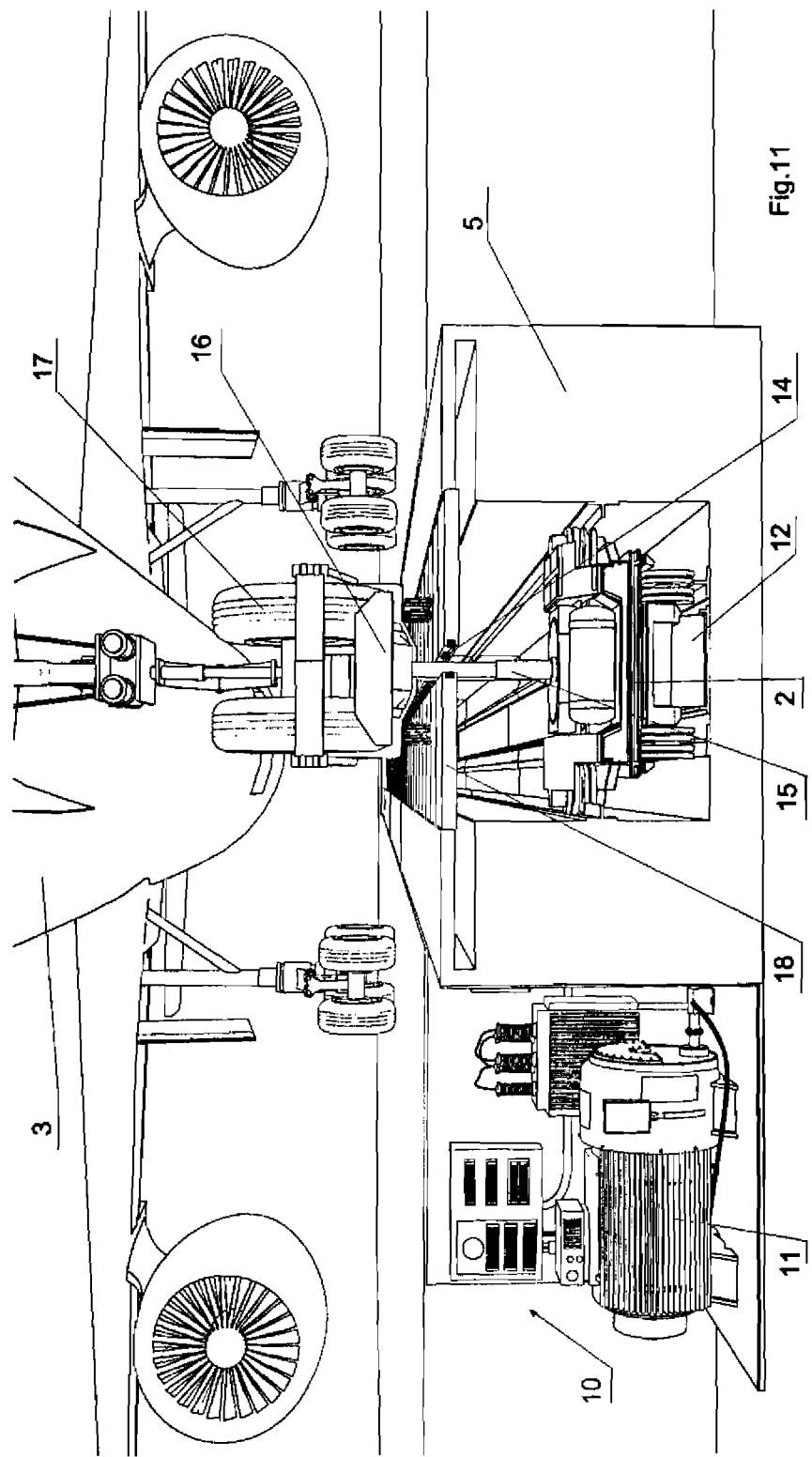

SYSTEM OF DRIVING CHANNELS FOR A CARRIAGE FOR TRANSPORTING AIRPLANES ON AN AIRPORT APRON

TECHNICAL FIELD

The exemplary embodiments concern a system of driving channels for a carriage used for transporting airplanes on an airport apron. Airplanes may be moved from a parking location to a take-off location adjacent a runway, or from a landing location adjacent a runway to a parking location at a terminal, or for example a parking location at a servicing location or fueling location.

BACKGROUND

Airplanes generally move on an airport apron, from a parking location to a runway or from a runway to a parking location after landing, under their own power, with the engines on. Attempts have been made to develop another system for transporting airplanes on the airport apron from a landing/take-off location to a parking location and vice versa.

An assembly for transporting an airplane on an airport apron from a parking location to a take-off location and from a landing location to a parking location with an airplane's engine off is known from the Polish patent specification No. PL216097B1. The assembly comprises docking stations made in a surface of access ways (taxiways) to a runway of an airport. Docking stations are connected to guiding grooves located along the route of airplane movement to a parking location. In the docking stations there are mounted leading mandrels, which are preferably fastened to the front wheel of the airplane after bringing it to the docking station. From the main transport route the terminal transport routes are branched off. Guiding grooves which constitute such routes are covered from the top with pivotable gratings having a segmented structure. The pivotable gratings automatically open in front of the leading mandrel moving in the guiding groove. After passage of the leading mandrel, the pivotable gratings close. In places where the guiding grooves change their direction, in places where there are abrupt curves and in junctions of the main transport route to the terminal transport route, switching devices are installed.

From the Polish patent specification No. PL216097B1 a carriage assembly is known. The carriage assembly is intended for a system for transporting airplanes on the airport apron, from a parking location to a runway and from a landing location to a parking location. The system for transporting airplanes on the airport apron is formed by guiding channels. In the guiding channels leading mandrels are movable, said mandrels being installed in docking stations and hook-mounted to the airplane. The guiding channels are covered from the top by pivotable plates of a segmented structure. The carriage assembly moves in a guiding channel that has a rectangular cross-section, the bottom of which is provided with lower guiding rails and its sidewalls are provided with side guiding rails and a carriage that constitute spatial constructions. The carriage construction has a bottom part and side parts. The carriage is provided with a set of lower ground wheels seated in the bottom part of the carriage and a set of side ground wheels seated in both side parts of the carriage. The disclosure of U.S. Pat. No. 9,248,919 which describes many of such features is incorporated herein by reference in its entirety.

Discussion

The objective of some exemplary embodiments is to develop a system of driving channels for a carriage that transports airplanes on the airport apron, in particular from a landing location to a parking location and from a parking location to adjacent a take-off location. The system of channels is intended to provide easy assembling thereof on an existing airport apron in a fast and safe manner, since it may be implemented stepwise, and causes making inoperative only a small area of the airport apron for the time necessary for installing the system. As a result of the use of this exemplary system an airplane may be lighter due to need for less fuel, more cost-effective in use, and will decrease emission of toxins into the environment as well as enhance safety during taxing by means of automatic control systems that control airplane traffic within the airport.

According to an exemplary embodiment, a carriage assembly is intended for a system for transporting airplanes on the airport apron, from a parking location to a runway and from a landing location to a parking location. The exemplary system for transporting airplanes on the airport apron is formed by guiding channels. In the guiding channels leading mandrels are movable. The mandrels are installed in docking stations and hook-mounted to the airplane, and the guiding channels are covered from the top by pivotable plates of a segmented structure.

According to an exemplary embodiment, a system of driving channels is provided for a carriage for transporting airplanes on the airport apron. The carriage includes an actuator or a mandrel with a basket seated thereon. The carriage is movable in the channels which are arranged in taxi routes from at least one airplane landing location to at least one parking location and from at least one parking location to at least one take-off location adjacent to a runway. Exemplary arrangements include channels formed by adjacent channel segments. The channel segments are depressed and extend downward in the airport apron so that their top surface and the opening thereof and associated cover plates are generally flush with the surface of the airport apron.

In exemplary arrangements, channel segments comprise straight channel segments.

In exemplary arrangements, channel segments comprise crossing channel segments.

In exemplary arrangements, channel segments comprise bifurcating channel segments.

In exemplary arrangements, channel segments comprise turning (e.g. curved) channel segments.

In exemplary arrangements, the plurality of adjacent channel segments define elongated driving channels that define taxi transporting routes and terminal transporting routes for airplanes. Such routes may include for example routes on the airport apron between an area adjacent runways such as landing sites to parking locations adjacent an airport terminal, such as a passenger terminal. The driving channels may also extend from such terminals to areas adjacent to various runways of the airport. Elongated driving channels may also extend to parking locations such as fueling locations, repair locations, storage locations, hangar locations or other locations to which airplanes may desirably be transported within the airport or similar facility.

In exemplary arrangements, each of the channel segments is provided with at least one driving unit comprising a motor, and a transmission gear, that puts in motion a carriage that transports the airplane. The motor may be for example, an electric, pneumatic, hydraulic or combustion motor, and said transmission gear may include for example, one or more of a friction gear or roller, toothed gear, tension gear such as a wire rope or cable, chain gear such as a drive chain, belt or band or similar moving member, transmission, shaft gear such as a worm gear. In some exemplary arrangements, the driving unit comprises a magnetic drive.

Also, channel segments along their entire length are provided at their upper opening a surface including movable plates of a segmented structure. The plates are selectively openable when necessary such as to retract a portion of a wheel engaging basket into the upper opening.

In some exemplary arrangements, the movable plates are positioned when in a closed position to provide an open elongated slot. An actuator attached to the transporting carriage is movable along and within the slot. The actuator may movably support and carry a basket of the transporting carriage, in which at least one front wheel of the airplane being transported is seated and held in engagement.

In some exemplary arrangements, the channel segments along their entire length are provided at their upper open surface with slidable or pivoting plates of a segmented structure, openable when necessary. In a closed position a central portion of opposed plates abound an elongated slot in which at least one actuator attached to the transporting carriage is movable. The actuators support a basket of the transporting carriage, in which the at least one wheel of the airplane being transported is/are seated.

In exemplary systems, activating and stopping of the individual motors and transmission gears associated with the channel segments that transport airplanes are controlled fully automatically by one or more control systems. The systems are monitored by the ground personnel of the airport, preferably in cooperation with the pilot of the airplane.

BRIEF DESCRIPTION OF DRAWINGS

FIG. 11 shows a straight channel segment in cross-section.

DETAILED DESCRIPTION

Figure 1:
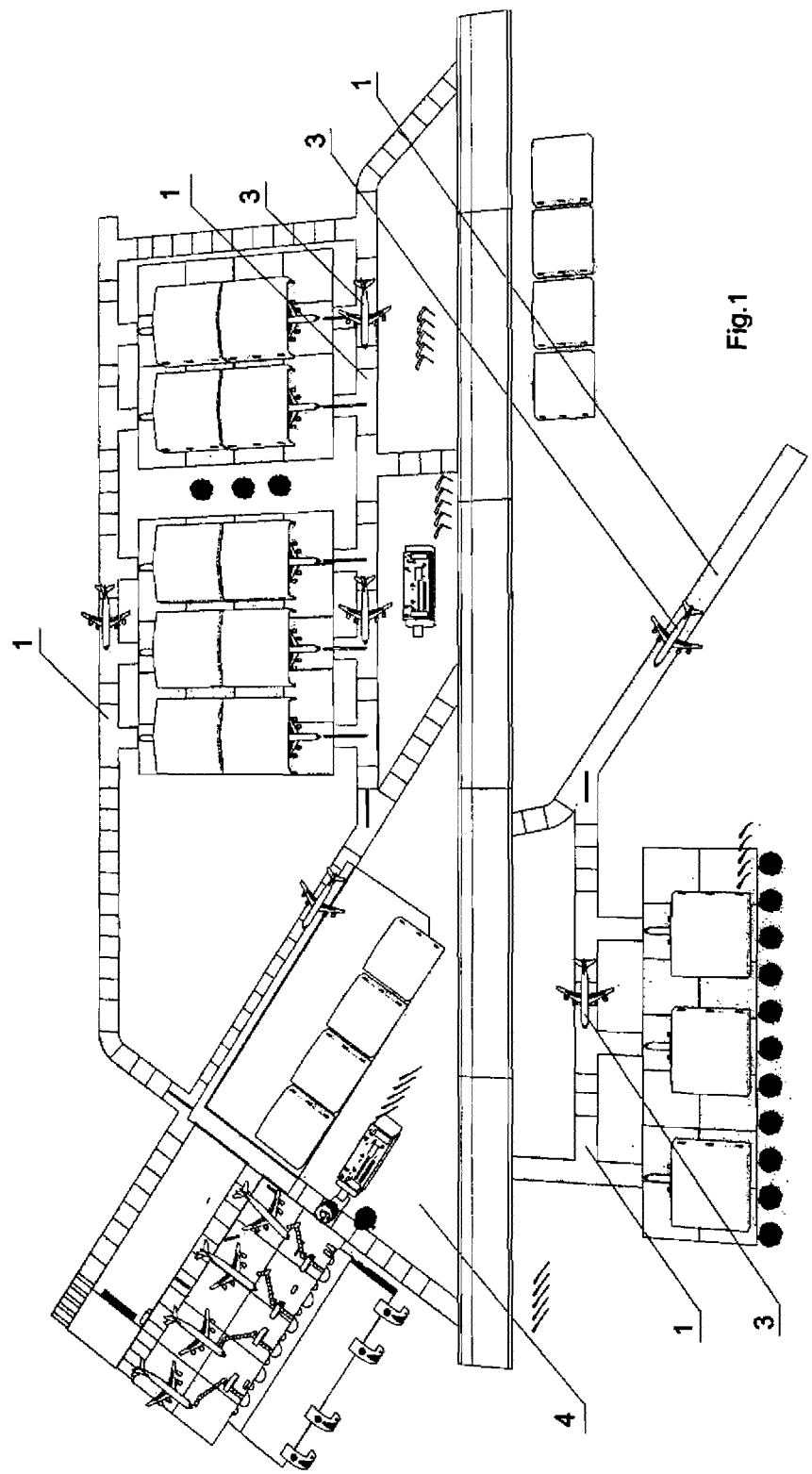
FIG. 1 shows an exemplary airport apron with driving channels arranged thereon along with airplanes being transported, in a top view.

In the exemplary embodiment shown in FIG. 1, is an airport intended for taking-off and landing airplanes 3. The airport has an airport apron 4 that extends adjacent to take-off/landing locations as well as to defined parking locations for airplanes 3. From such take-off/landing location of an airplane 3 to a parking location, the airplane 3 has to move on the airport apron 4. For this purpose driving channels 1 are formed in the airport apron 4, as schematically presented in FIG. 1.

Figure 2:
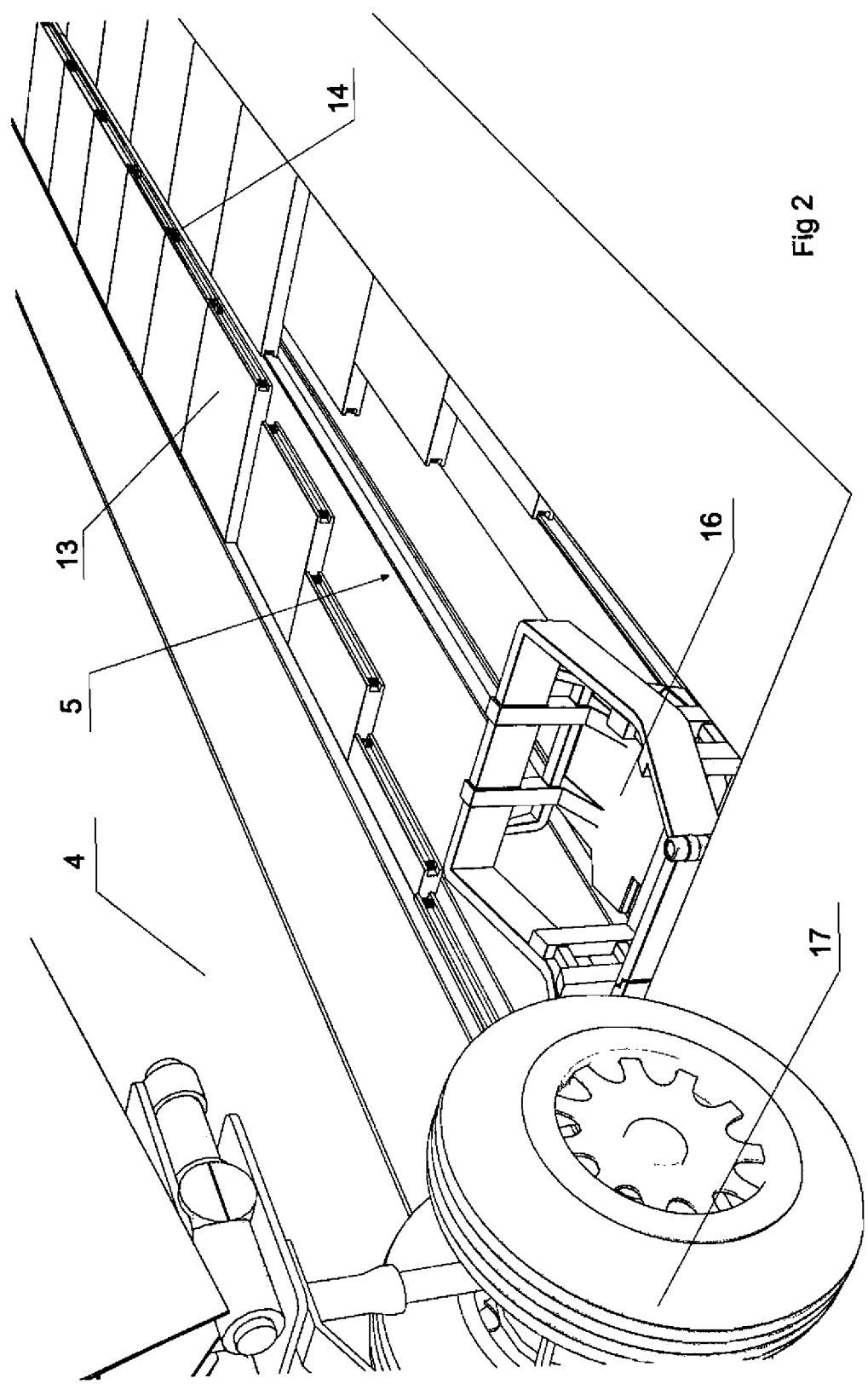
FIG. 2 shows an exemplary carriage in a guiding channel segment with a basket on which at least one wheel of the airplane rides during transport.
Figure 3:
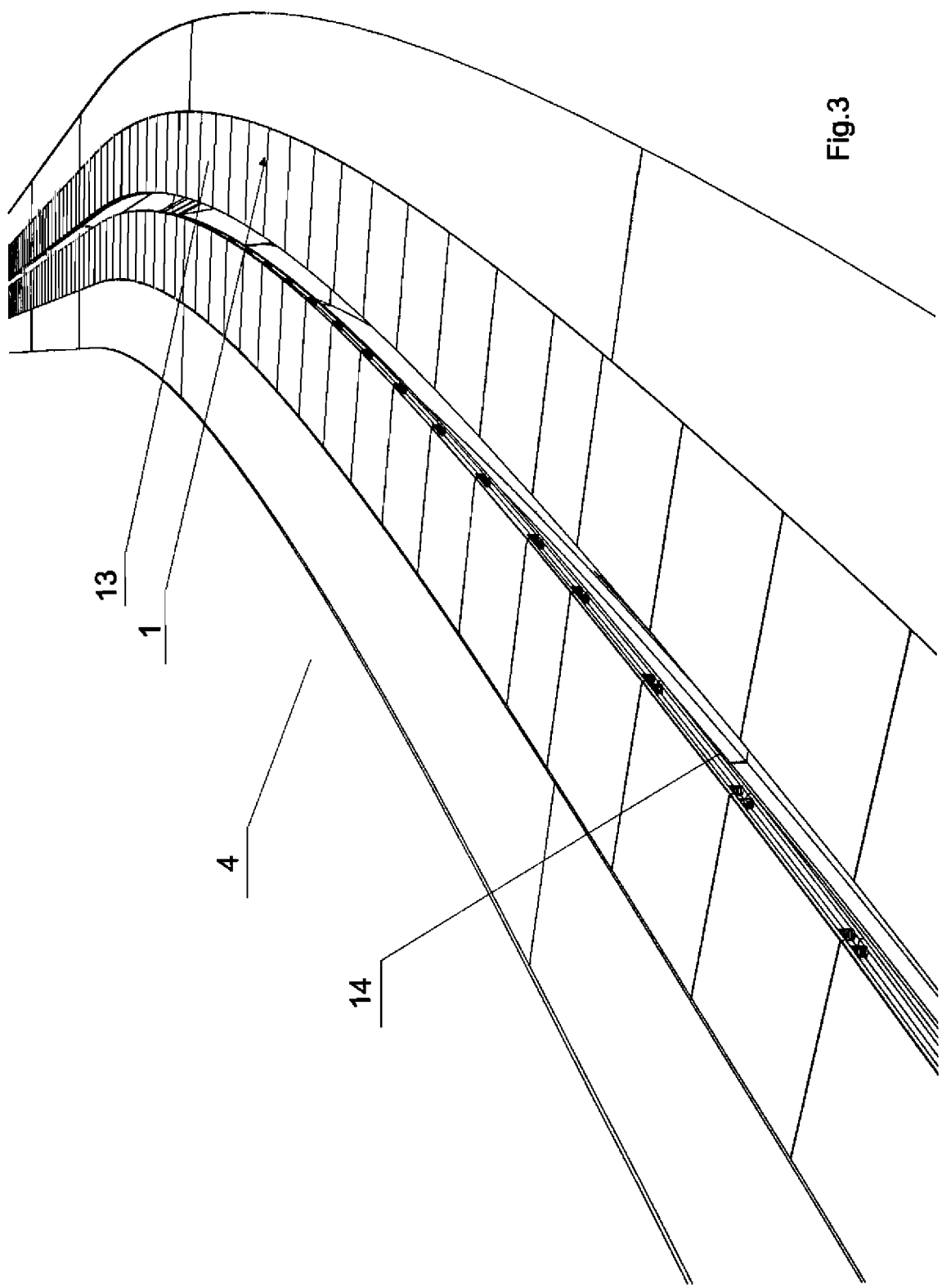
FIG. 3 shows the airport apron with a driving channel covered by movable plates that bound an elongated slot.
Figure 4:
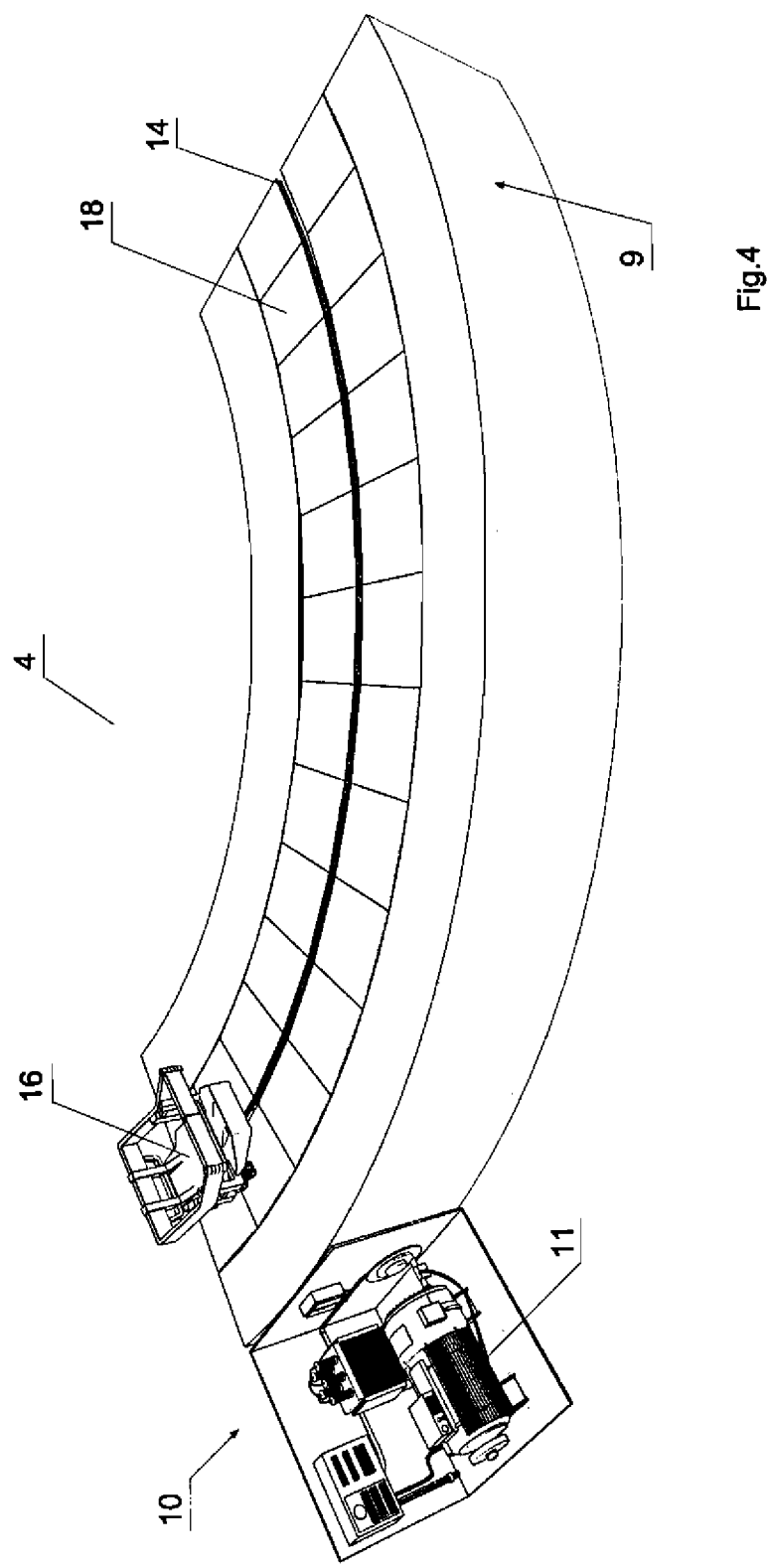
FIG. 4 shows a turning (curved) channel segment.
Figure 5:
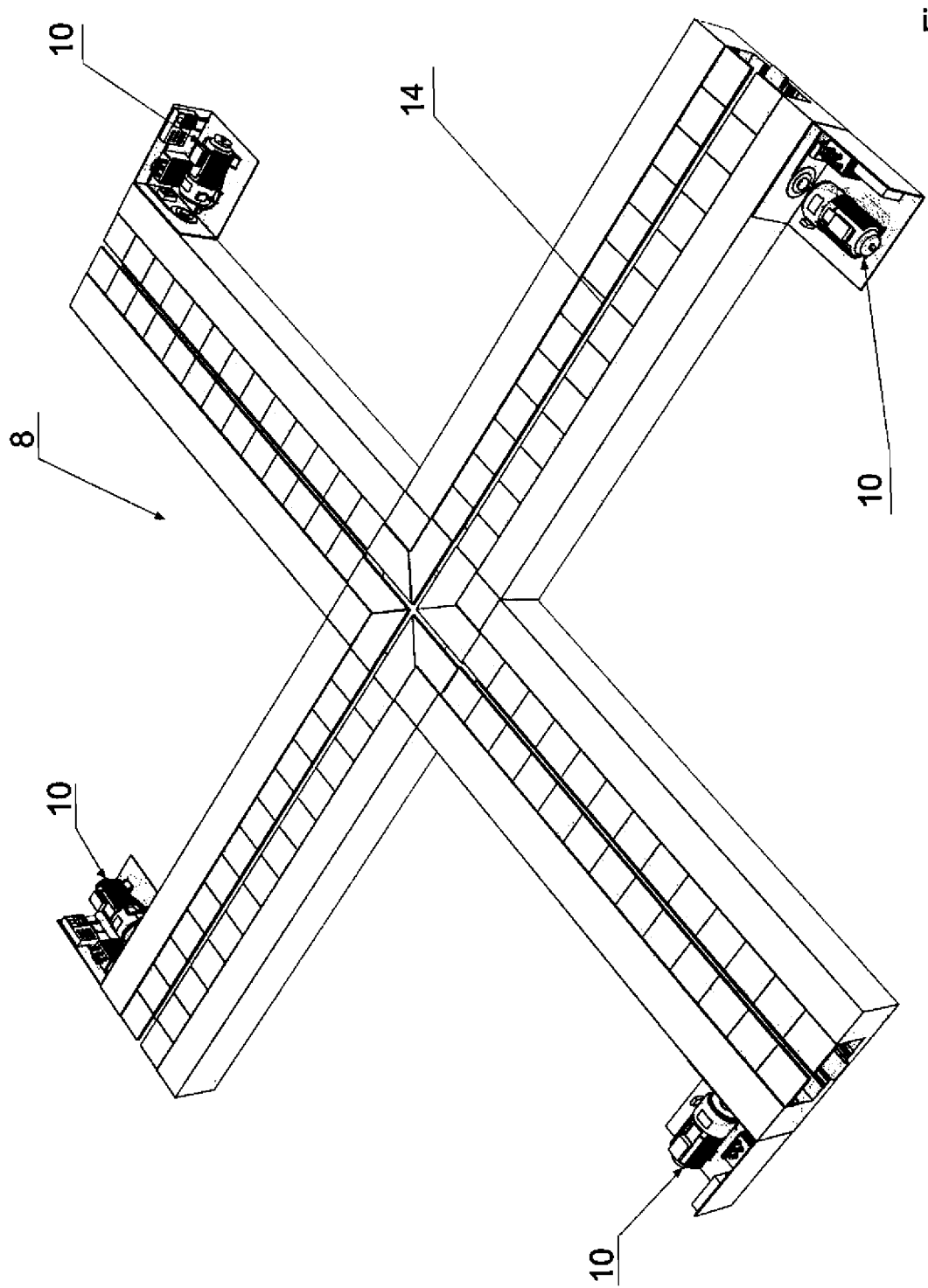
FIG. 5 shows crossing channel segments.
Figure 6:
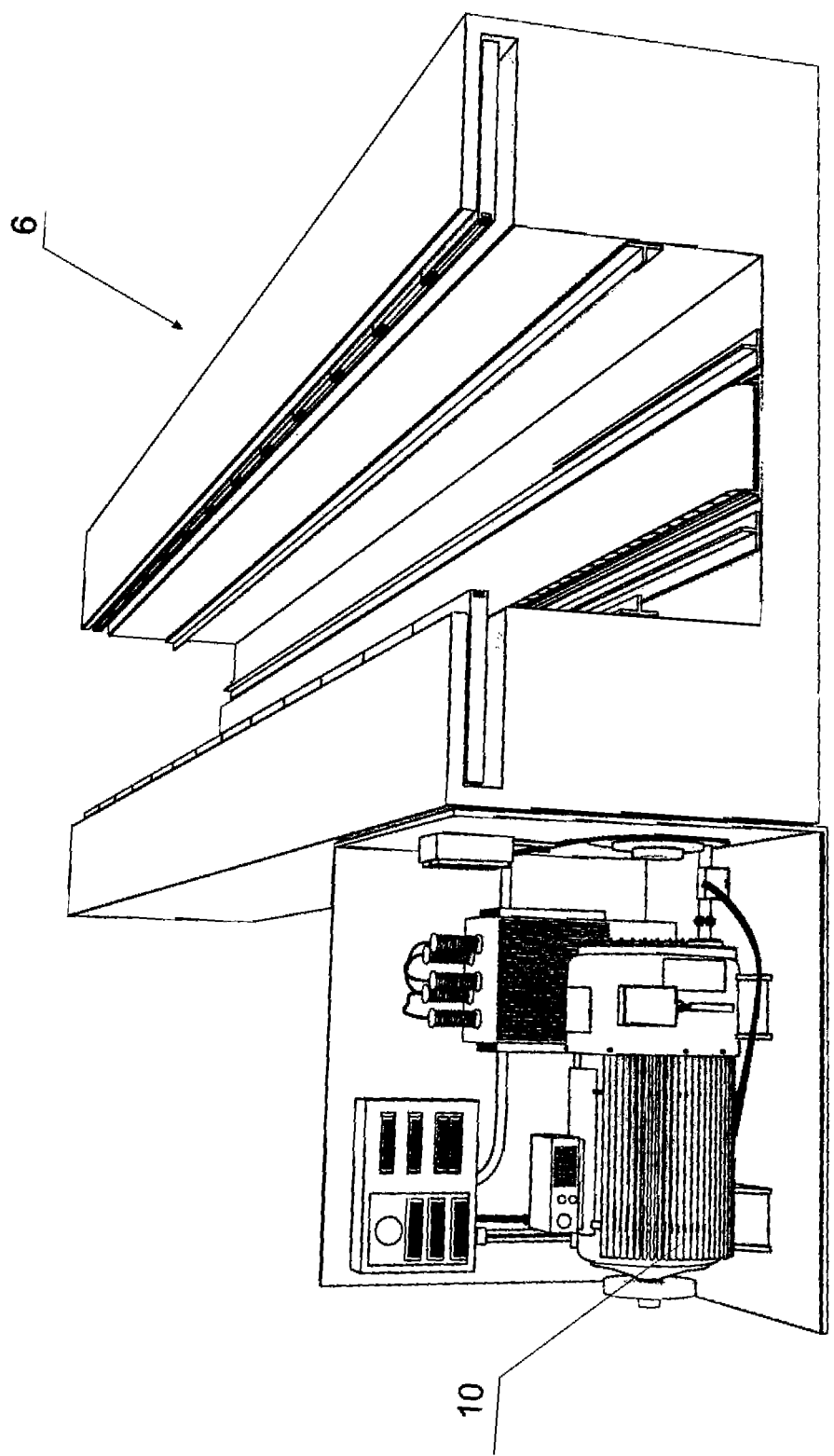
FIG. 6 shows a straight channel segment.
Figure 7:
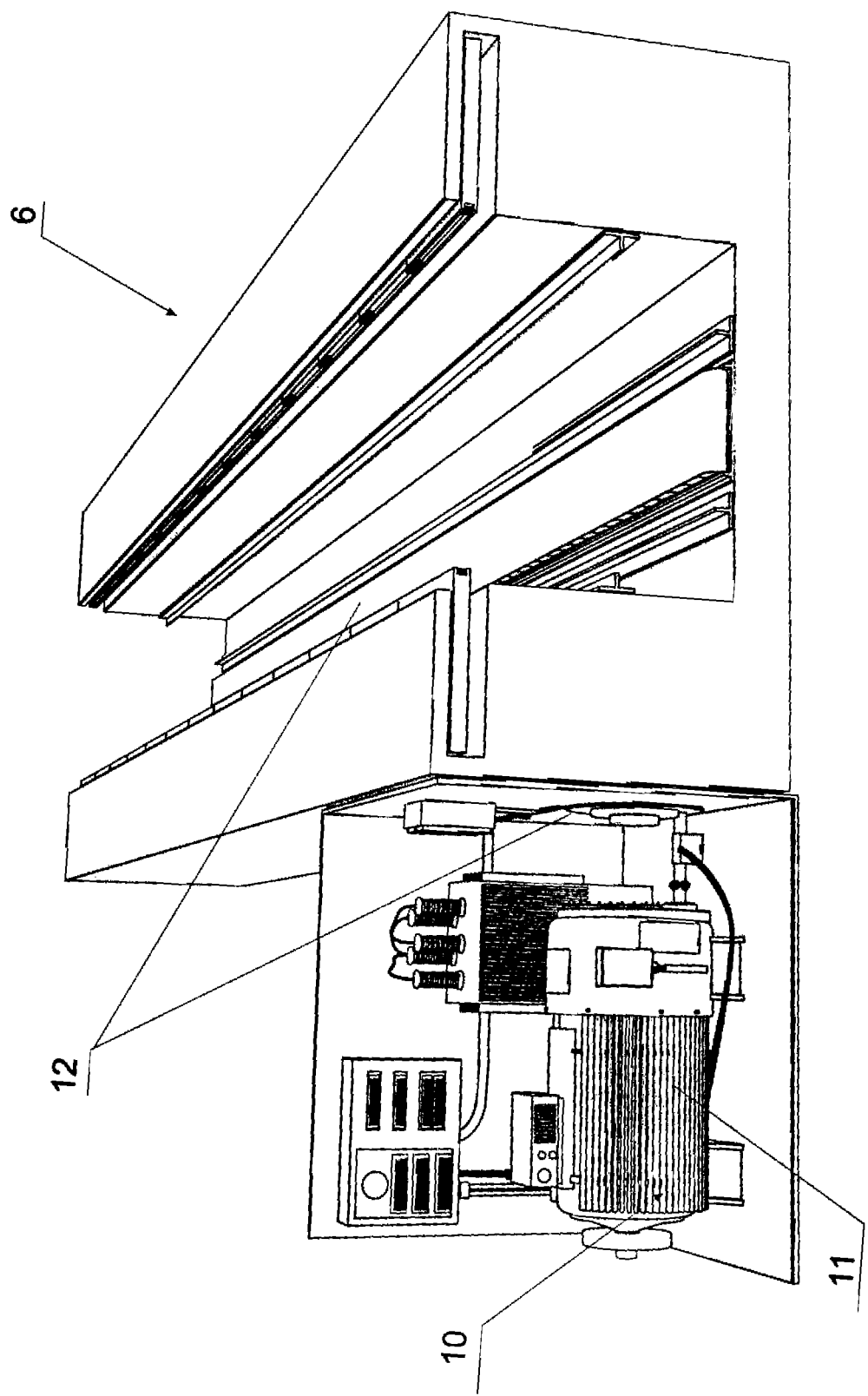
FIG. 7 shows a straight channel segment.
Figure 8:
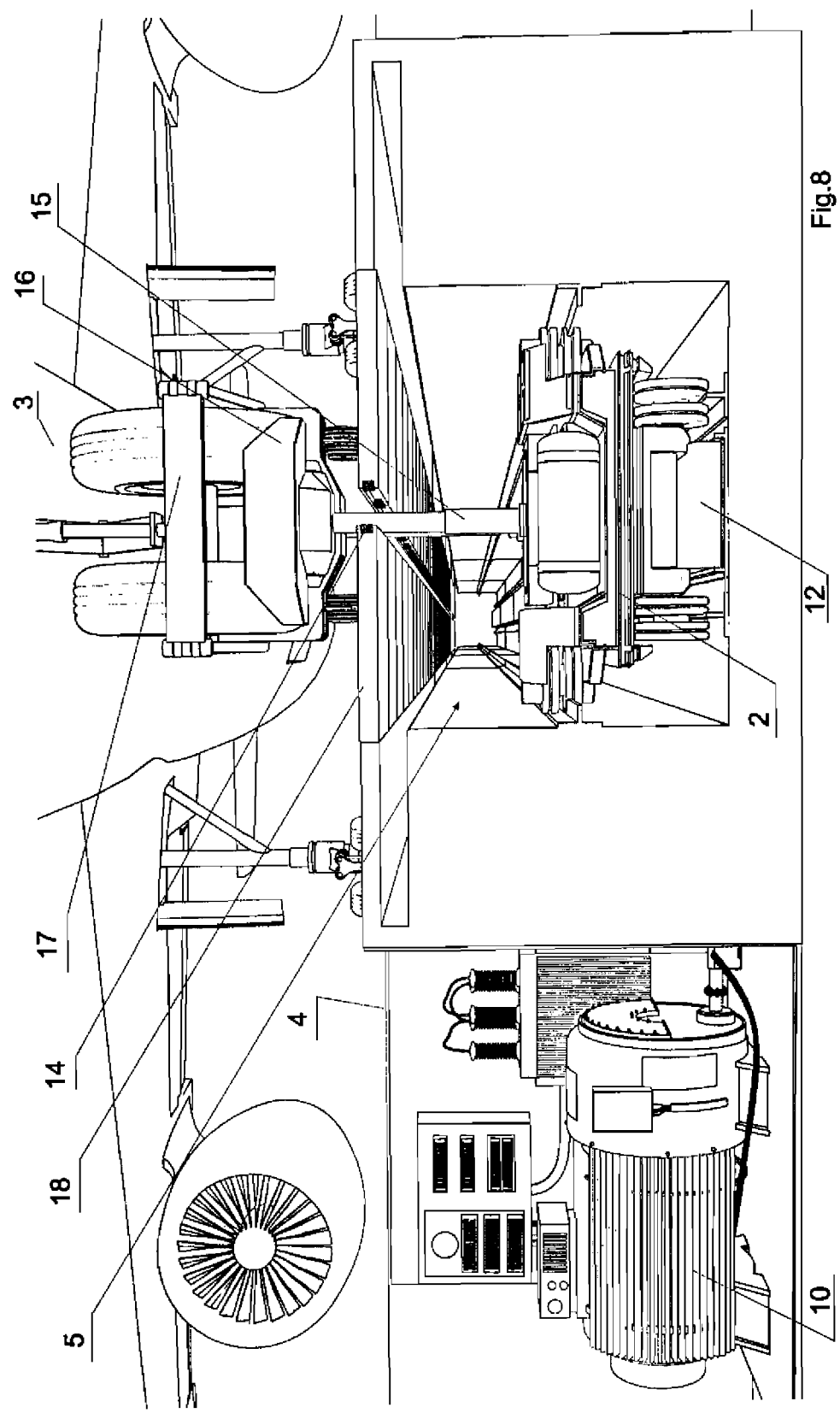
FIG. 8 shows a channel segment in cross-section.

In an exemplary driving channel 1 formed in the airport apron 4 a transporting carriage 2 is movable. The carriage has at least one carriage actuator 15. A basket 16 is operatively attached to the carriage and the actuator. The basket is configured so at least one wheel 17 of an airplane 3 may be positioned and engaged therewith, as shown in FIG. 2, FIG. 8, and FIG. 11. In this embodiment, on the basket 16 of the transporting carriage 2 the front wheel of the plane 3 may be positioned and held in engaged relation. Of course, the term front wheel 17 of the airplane 3 also includes a front wheel assembly that may comprise multiple wheels, for example twin wheels. An exemplary embodiment of the at least one actuator may include movement devices such as hydraulic or pneumatic cylinders, electrical motor driven struts or other components that are selectively operable to move the basket generally vertically up or down relative to the carriage. It should further be understood that while in the exemplary arrangement the basket shown is configured to operatively engage at least one front wheel of the airplane by having the wheel positioned therein, in other exemplary embodiments the basket may include different structures. These may include, for example, engaging structures that operatively engage the wheels by engaging other wheel portions or portions of the landing gear to which the wheels are attached so as to selectively engage such structures such that they can be moved with the carriage, thereby moving the airplane.

Figure 9:
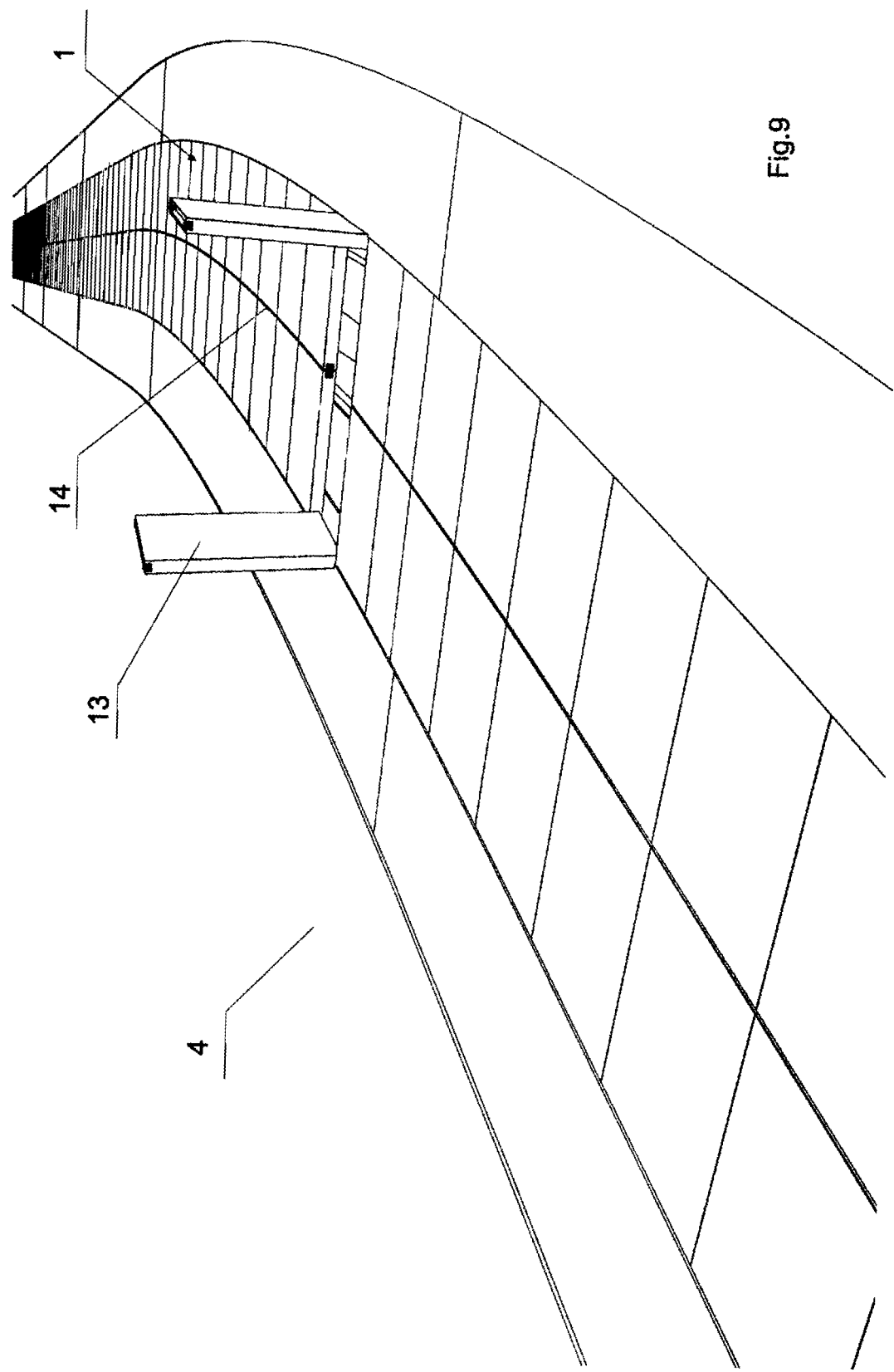
FIG. 9 shows an airport apron with some open pivotable plates.
Figure 10:
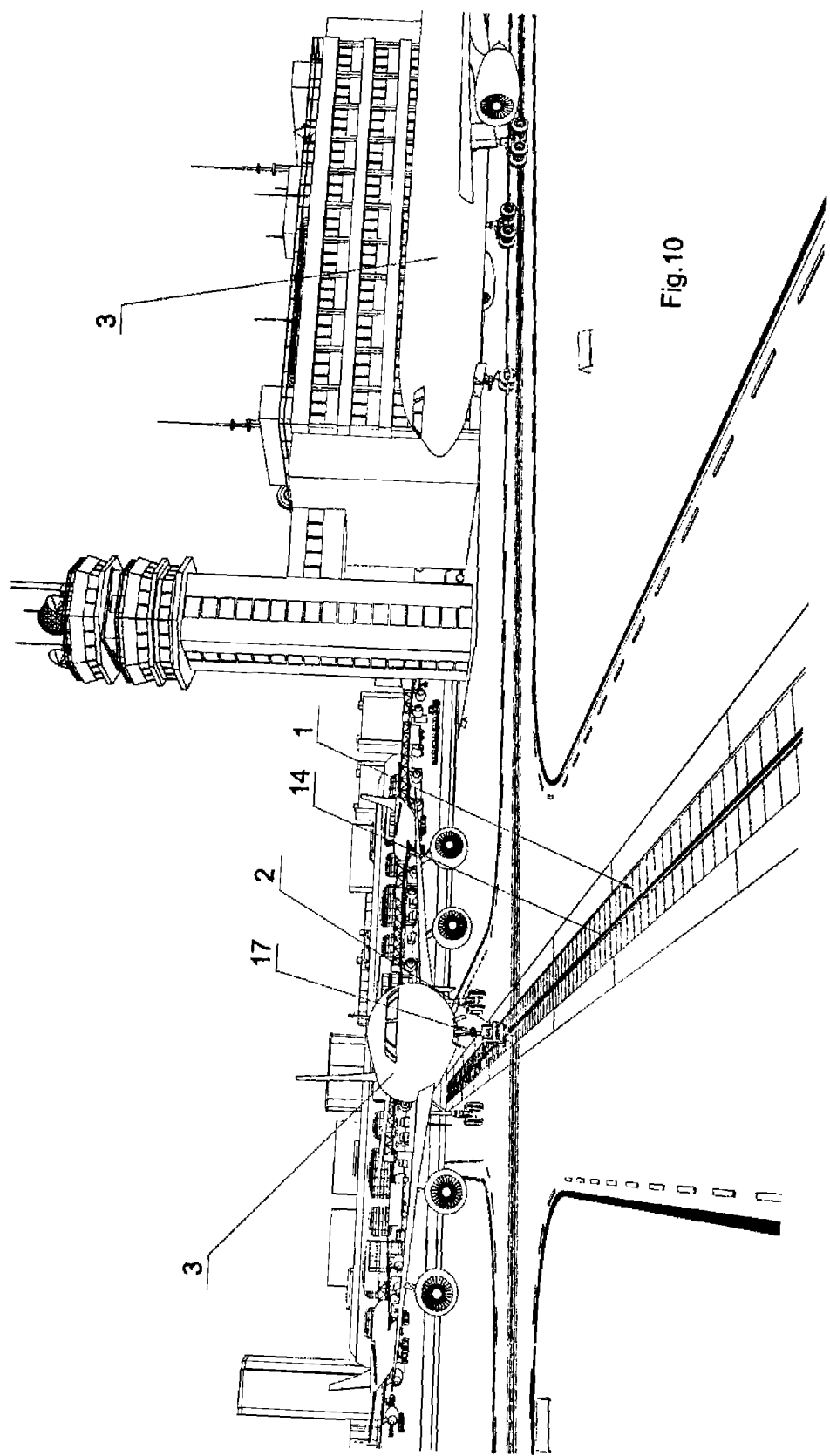
FIG. 10 shows a part of an airport with crossing driving channels.

FIG. 2 shows schematically a wheel 17 of an airplane 3 seated on an exemplary basket 16 of a transporting carriage 2 located within a driving channel 1. The carriage structure within the channel segment is not visible during movement of the transporting carriage 2 within the driving channel 1. The exemplary driving channel 1 is usually covered with segmented movable plates 13. In some arrangements plates may be movable by being pivoted upward, as shown in FIG. 9, or movable slidably aside so as to open portions of the upper opening of the driving channel 1, as shown in FIG. 2 and FIG. 8. In exemplary embodiments, the channel segments may include features like those described in U.S. Pat. No. 9,248,919 which is incorporated herein by reference in its entirety.

The exemplary driving channel 1, within which the transporting carriage 2 is moved for transporting airplanes 3 from a take-off/landing location to a parking location, has to be routed in a way so as to enable movement of the airplane 3 between these desired locations. Therefore the driving channel covers a considerable part of the airport apron 4 which involves certain problems during laying the transporting channel 1 on the existing airports and, at a lesser extent, on airports under construction.

In order to ensure efficient installation of the driving channel 1, as well as enabling stepwise construction thereof, the exemplary driving channel 1 is formed of channel segments 5. Such channel segments constitute lengths of the driving channel 1 being built. Exemplary channel segments 5 are shown in FIG. 2, FIG. 4, FIG. 5, FIG. 6, FIG. 7 as well as in FIG. 8 and FIG. 11.

Due to the fact that the driving channel 1 may be routed along a path with curved turns, bifurcations (e.g. branching from a single channel to multiple channels or combining multiple channels to converge into a single channel) and crossings, channel segments 5 have such configurations to allow for such arrangements. This is why the exemplary system of driving channels 1 for a carriage 2 that transports airplanes 3 on the airport apron 4 comprises straight segments 6, shown in FIG. 6 and FIG. 7, crossing segments 7, shown in FIG. 5, turning segments 9, shown in FIG. 4, and bifurcating segments. In exemplary arrangements, such channel segments are arranged in adjacent relation such that the carriage is movable from one channel segment to another channel segment to control the movement of the carriage so as to move the attached airplane along the driving channel between the locations as may be desired for the current circumstances of the airplane.

The exemplary driving channel 1 is built on the airport apron 4 by digging out a suitable trench in the ground for each subsequent channel segment 5. Such segments may be, according to the particular need, a straight segment 6, a crossing segment at a point where different lengths of the driving channel 1 are crossed, a bifurcating segment at a point where a possibility to select the further course of the driving channel 1 is intended, and turning segments 9 for which a varied curvature of the turn may be provided. Of course different configurations for channel segments are possible depending on the needs and configuration of the particular driving channel through which aircraft are moved to desired locations.

In the trench dug out in the airport apron 4 a channel segment is located in a manner so that the top surface of the channel segment 5 is generally flush with the surface of the airport apron 4. As can be appreciated, in exemplary arrangements the channel segment includes an upper opening. The upper opening may be selectively closed by the movable plates that are operatively attached to the channel segment. The movable plates are movable to open the upper opening so as to enable access to the interior area of the channel segment. Normally the movable plates are in a closed position, generally closing the upper opening of the channel segment. In this manner a level surface is obtained that in an exemplary arrangement has a narrow elongated slot 14 only. In the exemplary arrangement an elongated slot is created between the movable plates 13 in their closed position. Rollers may be included on the surfaces of the plates, bounding the slot to facilitate movement of an actuator structure therein. The slot 14 formed by the top plates of the channel segment 5 does not impede the use of the airport apron 4 with the driving channel 1 when compared to an airport apron 4 without such a channel. With the exemplary system the airport apron may be also used in the same way as it was used before the driving channel was installed. No problems are encountered when moving other vehicles on the airport apron 4 on or adjacent to the movable plates in the closed position.

As shown, in an exemplary embodiment illustrated in FIG. 4, FIG. 5, FIG. 6, FIG. 7, FIG. 8 and FIG. 11, each channel segment 5, either a straight one 6, a crossing one 7, a turning one 9 or a bifurcating one, is provided with at least one driving unit 10 that enables movement of the transporting carriage 2 inside and in guided relation with the interior of the channel segment 5. In exemplary arrangements, each channel segment 5 may be independent relative to other channel segments 5 with regard to movement of the transporting carriage 2. The guiding structures such as guide rails and wheels like those mentioned in the incorporated disclosure may be included in the interior of each channel segment. Such structures may be included in aligned relation in adjacent channel segments so as to form a continuous guiding structure. As a result, the carriage is movable from one channel segment to another in guided relation in the interior of each respective channel segment.

Exemplary channel segments 5 may comprise more than one driving unit 10. For crossing segments 7 or bifurcating segments multiple driving units may be necessary, while generally for straight segments and turning segments, more than one driving unit is not necessary.

Each exemplary driving unit 10 comprises a motor 11 in operative connection with at least one transmission gear 12. In the exemplary embodiments shown in the drawings, in driving units 10 a motor 11 is used which may include an electric motor. In other exemplary embodiments a motor 11 may be used which is a pneumatic motor, combustion motor or a hydraulic motor. In other exemplary embodiments, the motor may include a magnetic driving unit.

Exemplary transmission gears 12 may include for example one or more moving members such as belts. Such transmission gears may also or alternatively include a toothed gear, such as one or more cog gears or cog belts. Exemplary transmission gears may also include friction gears such as one or more friction rollers. Exemplary transmission gears may also include tension gears such as cables, wire ropes or chains. Further exemplary transmission gears may include for example, a shaft gear, such as a worm gear arrangement, that moves a body or similar structure responsive to rotation thereof. In other exemplary embodiments, the transmission gear may include one or more magnets which are operable to be moved via the magnetic drive so as to impart movement to the carriage.

Further it should be appreciated that in exemplary arrangements channel segments may include multiple types of transmission gears, each of which may operatively engage the carriage so as to selectively move the carriage in and through the respective channel segment. Of course it should be understood that these transmission gear types are exemplary and in other embodiments, other types of transmission gears and motion imparting structures may be utilized for purposes of moving the carriage.

An exemplary arrangement devices that are operative to move the carriage and which comprise the transmission gears extend within the channel segments. In some exemplary arrangements, the transmission gear structures 12 such as belts, magnets, rollers, cables and other structures extend laterally between the guide rails which guide the movement of the carriage within the channel segments. For example in some arrangements, belts, cables, chains, rollers or similar structures (which are schematically represented) may be movable between the guide rails and in operative connection with the carriage so as to move the carriage in the desired manner through the channel segments. Alternatively or in addition, other transmission gear structures such as rollers, gears, belts, etc. may extend in connection with the carriage adjacent side wall portions of the channel segment or other areas so as to impart selective movement thereto. Further in exemplary arrangements, magnets or other suitable structures may be movable within the channel segment so as to move magnetic components of the carriage selectively as desired. Of course it should be understood that these transmission gear structures are exemplary and in other embodiments, other types of movement imparting structures and devices may be utilized.

As shown in FIG. 4, FIG. 5, FIG. 6, FIG. 7, FIG. 8 and FIG. 11, a driving unit 10 is located in this exemplary embodiment in side cavities of the channel segments 5. In this configuration the driving unit does not obstruct the movement of the transporting carriage 2 inside the channel segment 5 of the driving channel 1.

In some exemplary arrangements not all of the channel segments 5 may be provided with their own driving units 10. In some cases the driving movement may be transmitted from a channel segment 5 provided with a driving unit 10 to a transmission gear or other carriage moving structures in another channel segment 5 which does not have its own driving unit 10. This may be done, for example, by having gears, shafts, rollers or other driving structures on one channel segment that includes its own driving unit, engaging driven structures on an adjacent channel segment so as to provide moving force to the transmission gear structures of the type utilized thereon for purposes of selectively moving the driving carriage. Numerous different approaches may be taken for providing power transmission from one channel segment to another.

By providing suitably aligned and adjacent channel segments, including driving units and suitable transmission gears, the transporting carriage 2 is precisely and reliably guided in the driving channel 1.

As can be appreciated in exemplary arrangements a control system may be operative to selectively position the carriage within a selected segment of the driving channel so that the basket thereof underlies or is positioned adjacent to the at least one front wheel of the aircraft. In exemplary arrangements, the basket or similar structure which operatively engages the wheels or landing gear structure may be selectively operative to include movable portions such as a movable bottom portion that can be aligned through operation of one or more actuators associated with the carriage generally at the same level as the top flush portion of the plates of the channel segment. In some exemplary arrangements the one or more vertically extending actuators may be operative to initially position the basket such that it is partially retracted into the upper opening of the channel segment through an open portion created by the movement of adjacent plates to an open position. Thereafter the basket may be moved through operation of the actuator to engage and/or capture the at least one wheel in engagement with the basket. In some exemplary arrangements this may be done through vertical movement of the basket structure relative to the carriage so as to elevate the at least one wheel of the airplane slightly above the level of the apron. Further in other alternative arrangements, the basket may have components or other structures that are movable so as to operatively engage the airplane by engagement of the wheel and/or landing gear associated therewith.

Likewise when an airplane has reached a parking location through controlled movement of the carriage, the airplane may be disengaged from the basket. This may be done generally through a manner by which the movable plates are operated to open a portion of the upper opening of the channel segment. The one or more actuators associated with the carriage may be operated to retract at least partially into the upper opening of the channel segment. Also in some exemplary arrangements a floor portion or other component of the basket may be moved so as to position the at least one front wheel of the aircraft at the same level as the closed plates such that the airplane may be otherwise moved therefrom by a tug or other unit, or alternatively the basket may be held in position until such time as the basket of the carriage is utilized to reengage and again move the airplane. Of course it should be understood that these approaches are exemplary and in other embodiments, other approaches may be used.

The exemplary airport apron 4 may be provided with several driving channels 1 of the type described in which a plurality of transporting carriages 2 may be selectively moved to transport airplanes 3 from a parking location to adjacent a take-off location and/or from adjacent a landing location to a parking location.

A system of driving channels 1 for a carriage 2 that transports airplanes 3 on an airport apron 4 allows for fully automatically activating and stopping the individual motors 11 and transmission gears 12 associated with driving units 10 in channel segments 5 included in driving channels 1. Exemplary arrangements of a central computer-based control system or multiple distributed control systems may be operative to control the operation of the carriage units and movement of associated aircraft engaged therewith for purposes of monitoring the status and position of a plurality of aircraft located on the airport apron. For example in exemplary arrangements wireless transceivers may be utilized in connection with the airplanes and the carriages for purposes of identifying the locations of each such airplane which is subject to movement or which has been moved to a parking location by an associated carriage. Further in exemplary arrangements, planned traffic movements may be calculated through operation of the control system so as to assure that airplanes are efficiently and safely moved and parked at desired locations for purposes of carrying out the necessary activities.

In exemplary arrangements while the automated control system may operate to automatically move the carriage structures in transporting and positioning airplanes, the exemplary control system may also include a user interface that is capable of enabling ground personnel at the airport to monitor and review current and future actions to be carried out by the automated system. Such systems may provide for manual override or other suitable functions so as to assure that airport monitoring personnel may avoid any issues that might arise particularly with aircraft or other vehicles on the airport apron that are not subject to control by the automated system. Further in exemplary arrangements, a pilot of an airplane that is being transported through the use of the system may also have the capability to provide inputs so as to enable a manual override or other action as may be necessary. This may include for example being able to engage an emergency stop of a carriage or disengagement of the airplane from the carriage so as to avoid a collision with another vehicle or other undesirable conditions. Of course these features are exemplary and in other embodiments, other approaches may be used.

It is clear that a person skilled in the art is able from the foregoing description, to modify and utilize in different ways the system of driving channels 1 for a carriage 2 for transporting airplanes 3 on the airport apron 4 and the individual elements or assemblies thereof as presented in the non-limiting example, without departing from the contents of the patent claims.

Thus the elements, features and characteristics of the exemplary embodiments described achieve desirable results, eliminate difficulties encountered in the use of prior devices and systems, solve problems and attain one or more useful objectives as described herein.

In the foregoing description, certain terms have been used for brevity, clarity and understanding. However, no unnecessary limitations are to be implied therefrom because such terms are used for descriptive purposes and are intended to be broadly construed. Moreover, the descriptions and illustrations given herein are by way of examples and the useful features are not limited to the exact details shown and described.

Further in the description, words that refer to left/right, top/bottom, up/down or similar terms indicating relative locations of items shall not be deemed limiting and it is to be understood that exemplary embodiments can be configured and used in numerous different orientations.

Having described the features, discoveries and principles of the exemplary embodiments, the manner in which they are constructed, operated and utilized, and the advantages and useful results attained, the new and useful structures, devices, elements, arrangements, parts, combinations, systems, equipment, operations, methods, processes and relationships are set forth in the appended claims.

I claim:

1. A method carried out using a carriage that moves relative to an airport apron in guided relation within at least one elongated driving channel that extends below the airport apron,
comprising:
(a) moving a basket in operative connection with the carriage upward relative to the carriage from a position at least partially below the airport apron to operatively engage at least one wheel of an aircraft;
(b) moving the aircraft relative to the airport apron along the at least one driving channel through movement of the carriage in the at least one driving channel with the basket operatively engaged with the at least one wheel.

2. The method according to claim 1
wherein in (b) the aircraft is moved between a take off or landing location and a parking location.

3. The method according to claim 2
and further comprising:
(c) subsequent to (b) moving the basket downward relative to the carriage to enable the at least one wheel to move out of engagement with the basket.

4. The method according to claim 3
wherein in (a) the basket is moved upward by an actuator that is in operative connection with the carriage and the basket,
wherein in (c) the basket is moved downward by the actuator.

5. The method according to claim 1 wherein a plurality of segmented plates are movable in operative connection with the driving channel,
and further comprising:
prior to at least a portion of (a) moving a first group of segmented plates in operative connection with the driving channel between a plate closed position and a plate open position to open a selected portion of an elongated upper opening of the at least one driving channel,
wherein in at least a portion of (a) the basket moves in the open selected portion.

6. The method according to claim 5
and further comprising:
prior to at least a portion of (b) moving at least some of the first group of segmented plates to the plate closed position wherein an elongated slot extends between the plates in the plate closed position,
wherein in (b) the basket moves positioned above the plurality of segmented plates in the plate closed position.

7. The method according to claim 1
wherein in (a) the basket is moved upward within the at least one driving channel.

8. A method carried out using a carriage that moves relative to an airport apron within at least one elongated driving channel that extends below the airport apron, comprising:
(a) moving a floor in operative connection with the carriage upward within the at least one driving channel to operatively engage the floor and at least one landing gear of an aircraft;
(b) moving the aircraft relative to the airport apron along the at least one driving channel through movement of the carriage in the at least one driving channel with the floor operatively engaged with the at least one landing gear of the aircraft.

9. The method according to claim 8 and further comprising:
(c) subsequent to (b) moving the floor downward relative to the carriage to enable the landing gear of the aircraft to move out of engagement with the floor.

10. The method according to claim 8
wherein in (a) the floor moves upward relative to the carriage from below the airport apron.

11. The method according to claim 8
wherein in (b) the aircraft is moved on the airport apron between
a takeoff location or a landing location and
a parking location.

12. A method carried out using a carriage that moves relative to an airport apron in guided relation within at least one elongated driving channel that extends below the airport apron, wherein a plurality of segmented plates are in moveable operative connection with the at least one elongated driving channel,
comprising:
(a) moving a first group of segmented plates in operative connection with the at least one driving channel from a plate closed position to a plate open position to open a selected portion of an elongated upper opening of the at least one driving channel,
(b) moving a basket in operative connection with the carriage upward relative to the carriage from a position at least partially below the airport apron to operatively engage at least one wheel of an aircraft, wherein during at least a portion of basket movement the basket extends in the open selected portion,
(c) moving the aircraft relative to the airport apron along the at least one driving channel through movement of the carriage in the at least one driving channel with the basket operatively engaged with the at least one wheel.

13. The method according to claim 12
and further comprising:
prior to at least a portion of (c) moving the first group of segmented plates to the plate closed position with the basket positioned above the plurality of segmented plates.

14. The method according to claim 13
wherein (c) further comprises moving the carriage within the at least one driving channel with the actuator extending in an elongated slot that extends between the plurality of segmented plates in the plate closed position, and with the basket positioned above the elongated slot.

15. The method according to claim 14
and further comprising:
(d) subsequent to (c) moving the basket downward relative to the carriage to enable the at least one wheel to move out of engagement with the basket,
prior to at least a portion of (d) moving a second group of segmented plates from the plate closed position to the plate open position to open a further selected portion of the upper opening wherein in at least a portion of (d) at least a portion of the basket extends in the further selected portion.

16. The method according to claim 15
and further comprising:
(e) subsequent to (d) moving the basket downward relative to the carriage into a retracted position in which the basket extends in the at least one driving channel below the plurality of segmented plates in the plate closed position.

17. The method according to claim 16
wherein (c) further comprises operating a drive in operative connection with the carriage to move the carriage in the driving channel.

18. The method according to claim 17
wherein the at least one driving channel comprises a plurality of channel segments,
wherein in (c) the carriage moves through at least one curved channel segment.

19. The method according to claim 18
and further comprising:
prior to at least a portion of (a) operating the drive to move the carriage into vertical underlying relation with the at least one wheel of the aircraft.

20. A method carried out using a carriage that moves relative to an airport apron within at least one elongated driving channel that extends below the airport apron, wherein a plurality of segmented plates are in moveable operative connection with the driving channel,
comprising:
(a) moving a first group of segmented plates in operative connection with the driving channel from a plate closed position to a plate open position to open a selected portion of an elongated upper opening of the at least one driving channel,
(b) moving a floor in operative connection with the carriage upward relative to the carriage within the at least one driving channel to operatively engage the floor and at least one landing gear of an aircraft, wherein during at least a portion of floor movement the floor extends in the open selected portion;
(c) moving the aircraft relative to the airport apron along the at least one driving channel through movement of the carriage in the at least one driving channel with the floor operatively engaged with the at least one landing gear of the aircraft.

21. The method according to claim 20
and further comprising:
(d) subsequent to (c) moving the floor downward relative to the carriage to enable the landing gear of the aircraft to move out of engagement with the floor,
prior to at least a portion of (d) moving a second group of segmented plates from the plate closed position to the plate open position to open a further selected portion of the upper opening, wherein during at least a portion of (d) the floor extends in the further open selected portion.

22. The method according to claim 21
and further comprising:
(e) subsequent to (d) moving the floor downward relative to the carriage into a retracted position in which the floor extends in the driving channel below the plurality of segmented plates in the plate closed position.

\* \* \* \* \*